Figure 2:
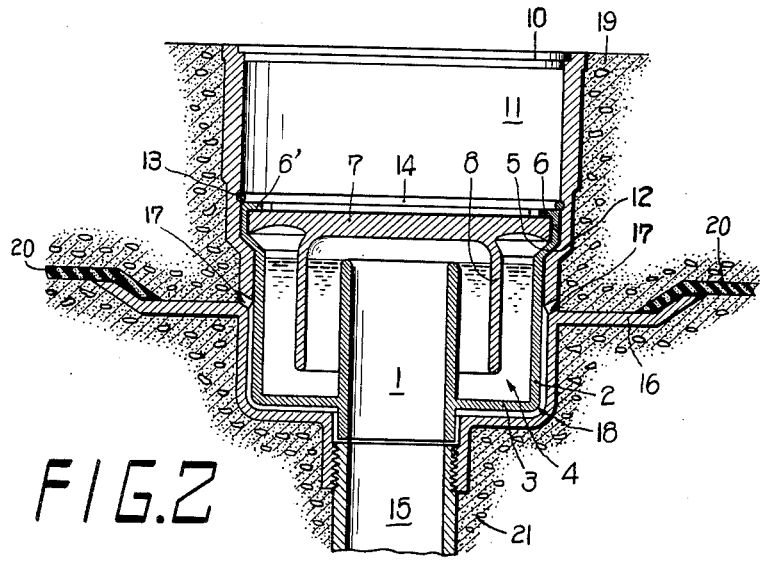

July 3, 1962 KYUHACHI HATTORI 3,042,210
DRAINAGE TRAP
Filed June 12, 1959 3 Sheets-Sheet 1

INVENTOR.
KYUHACHI HATTORI
BY
Wenderoth, Lind + Ponach
Attys.

July 3, 1962 KYUHACHI HATTORI 3,042,210
DRAINAGE TRAP
Filed June 12, 1959 3 Sheets-Sheet 2

INVENTOR.
KYUHACHI HATTORI
BY
Wenderoth, Lind + Ponack
Attys.

INVENTOR.
KYUHACHI HATTORI
BY Wenderoth, Lind & Ponack
Attys.

United States Patent Office
3,042,210
Patented July 3, 1962

3,042,210
DRAINAGE TRAP
Kyuhachi Hattori, Tokyo, Japan, assignor to Kasho Kabushiki Kaisha, Tokyo, Japan, a company of Japan
Filed June 12, 1959, Ser. No. 819,962
Claims priority, application Japan July 24, 1958
4 Claims. (Cl. 210—163)

This invention relates to a novel improved drainage trap.

One object of the present invention is to provide a novel drainage trap in which a deodorizing recessed channel portion of the trap is made detachable so that accumulated mud, dust and the like in the trap may be easily removed for cleaning.

Another object of the present invention is to provide a novel drainage trap in which a cover plate may be always maintained horizontally even if a drain pipe is equipped with some inclination in either direction rather than perpendicularly.

Still another object of the present invention is to provide a novel drainage trap which insures that any foreign matters such as dust which have flowed into the drainage trap together with water may accumulate within a deodorizing recessed channel without advancing into a drain pipe.

In a drainage trap according to the prior art, since a deodorizing recessed channel was integrally formed with an outer housing, it was very difficult to remove foreign matters such as mud, dust and the like when it accumulated within the recessed channel, and such foreign matters may likely pass through the recessed channel into the drain pipe and choke the pipe, thus causing an undrainable condition. In addition, in case a drain pipe is equipped with some inclination rather than perpendicularly because of certain reason, the trap is also compelled to incline accordingly, with the top cover plate of the trap inclined rather than in a coplanar horizontal surface with a floor, thus being inevitable of the disadvantage that not only it is prevented to function as a trap, but also makes a bad appearance.

According to the present invention, however, because of a detachable arrangement of a deodorizing recessed channel portion, when any foreign matters such as mud, dust and the like have accumulated within the recessed channel, these foreign matters may be easily removed for cleaning by detaching said recessed channel portion, and also due to a double construction of the deodorizing recessed channel and filtering holes provided in the inner recessed channel, these foreign matters are prevented from advancing into a drain pipe, so that the drain pipe may be kept always unchoked. Furthermore, by suitably adjusting the inclination of the detachable trap by means of adjusting screws upon inserting the trap, the top cover plate portion of the trap may be kept in a coplanar horizontal surface with a floor irrespective of the inclination of the drain pipe even if the drain pipe were equipped with some inclination, so that not only the performance of the trap is improved but also its appearance is always kept good.

Figure 3:
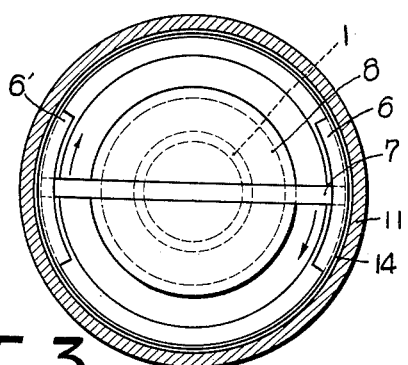
Figure 1:
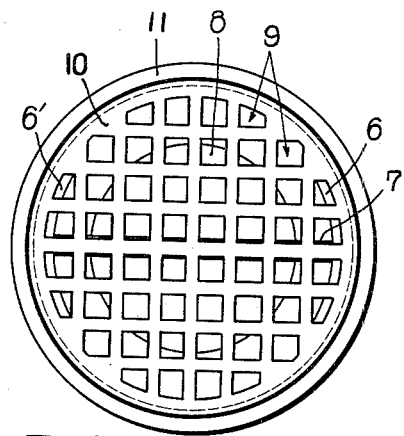
Figure 4:
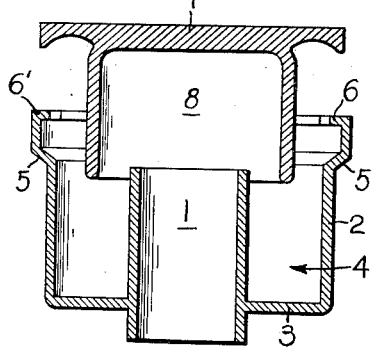
Figure 5:
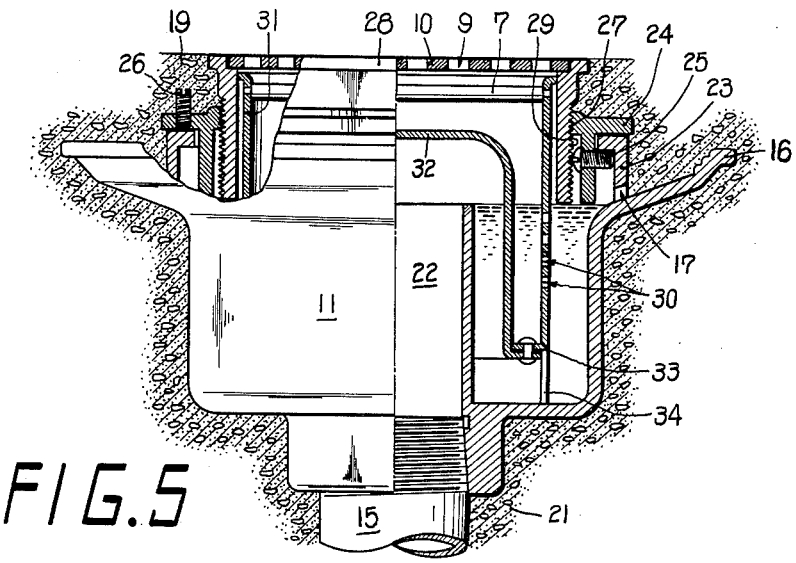
Figure 6:
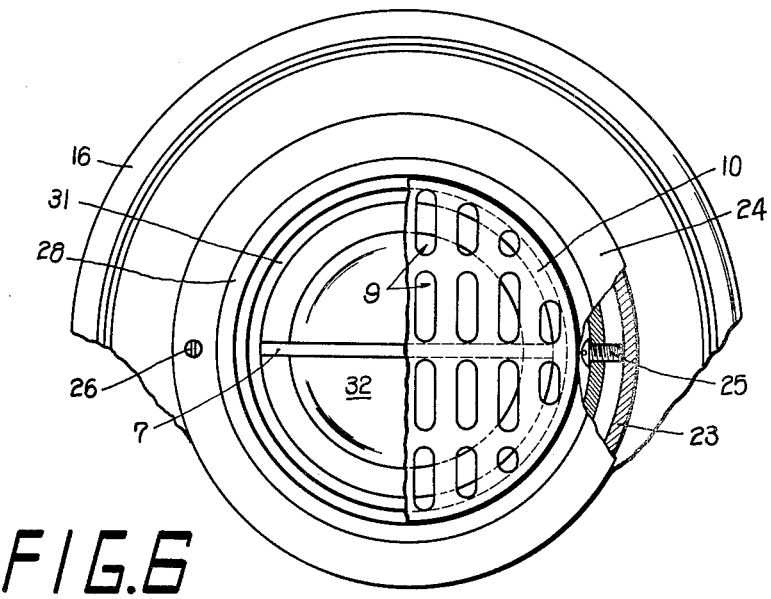
Figure 7:
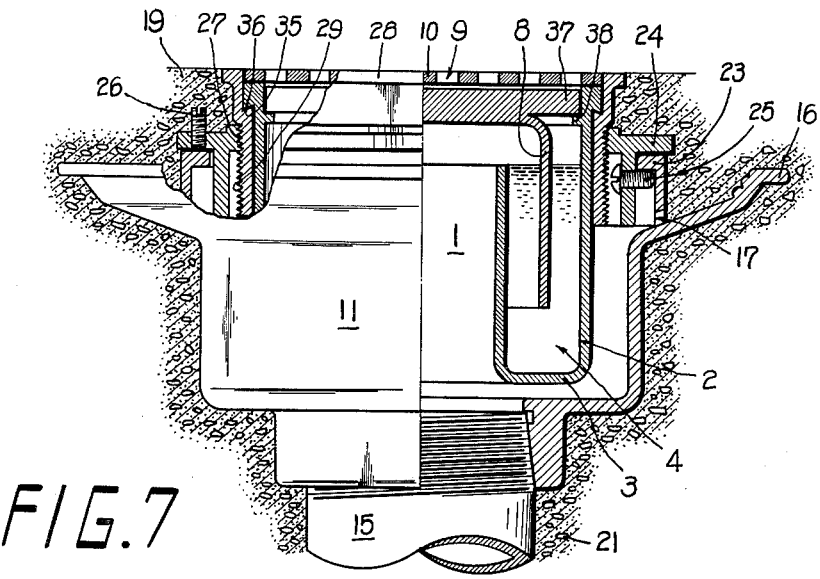
Figure 8:
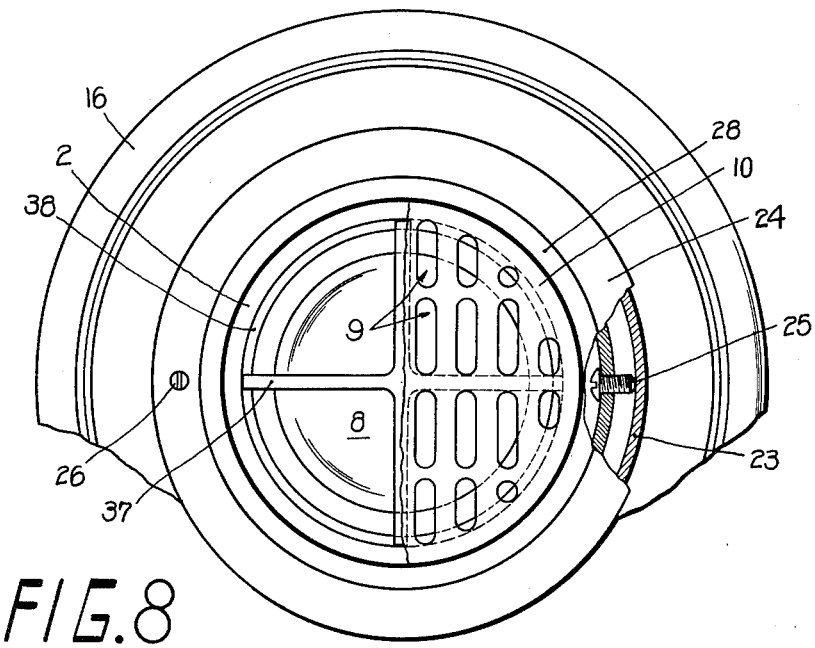

Now a structural construction according to the present invention will be described with reference to the illustrated embodiments in the accompanying drawings wherein, FIG. 1 is a plane view of an apparatus according to the present invention, FIG. 2 is a longitudinal cross sectional view of the apparatus in FIG. 1, FIG. 3 is a plane view partially cut away of the same, FIG. 4 is a longitudinal cross sectional view of the essential parts of the same in their detached position, FIG. 5 is a front elevational view partially cut away of another embodiment of the invention, FIG. 6 is a plane view partially cut away of the apparatus in FIG. 5, FIG. 7 is a front elevational view partially cut away of still another embodiment of the invention, and FIG. 8 is a plane view partially cut away of the apparatus in FIG. 7.

Referring now to FIGS. 1, 2, 3 and 4 of the accompanying drawings, on the lower outer circumference of inner cylinder 1, is integrally formed bottom wall 3 of closed bottom outer cylinder 2 to provide a ring type of deodorizing recessed channel 4, outer cylinder 2 having abutting slope 5 formed on its outer circumference and engaging edges 6 and 6' formed on its top inner circumference, and inverse cup-shaped bulkhead 8 incorporated integrally with handle bar 7 on its top, is inserted into said recessed channel 4 so that handle bar 7 may be engaged with engaging edges 6 and 6'. Also abutting slope 12 is formed inside of outer housing 11 which in turn carries cover plate 10 having openings 9 at its top portion, and outer cylinder 2 is fitted within outer housing 11 so that abutting slopes 5 and 12 may tightly abut together. Then spring 14 is fitted into peripheral channel 13 provided along the inner circumference of outer housing 11 in order to prevent the outer cylinder from rising to the water surface and being detached. In addition, there are shown in the drawings a drain pipe at 15 which is threaded into the bottom portion of outer housing 11, a leakage receiver at 16 which is integrally formed with and extends from the outer circumference of outer housing 11 at its middle portion, water convey holes at 17 which are provided in outer housing 11 at the level of the upper surface of said receiver, narrow channels at 18 which are formed on the outer circumference of outer cylinder 2 at its lower portion and on the inner circumference of outer housing 11, mortar at 19, waterproof plates at 20, and concrete at 21.

When foreign matters such as mud, dust and the like have accumulated within recessed channel 4, at first spring 14 should be detached from peripheral channel 13 after removing cover plate 10, then handle bar 7 can be lifted so that inverse cup-shaped bulkhead 8, outer cylinder 2 and inner cylinder 1 may be simultaneously taken up as a whole together with said handle bar, and rotating handle bar 7 so as to disengage with engaging edges 6, 6', inverse cup-shaped bulkhead 8 can be detached from recessed channel 4, whereby the inside of recessed channel 4 may be washed. When one wishes to reassemble the apparatus, handle bar 7 is caused to engage again with engaging edges 6, 6', outer cylinder 2 being fitted within outer housing 11, and spring 14 may be fitted into peripheral channel 13.

With reference to FIGS. 5 and 6 of the accompanying drawings, outer housing 11 is provided with a threaded bore at its bottom portion into which drain pipe 15 is threaded, convey cylinder 22 communicating with said threaded bore is integrally formed and extends from the inner bottom wall of outer housing 11, a flange of supporting cylinder 24 rotatably rests on inner projection 23 formed on outer housing 11, an extremity of stud bolt 25 projecting outwardly at the lower portion of said supporting cylinder is engaged with the lower edge of inner projection 23, and at a point along an extension of the line passing through said stud bolt and the center of supporting cylinder 24, adjusting screw 26 is threaded into supporting cylinder 24 so as to oppose the extremity of said adjusting screw against the upper surface of inner projection 23. Into an inner female screw portion 27 of supporting cylinder 24, is threaded male screw portion 29 of guide cylinder 28, and filtering frame 33 consisting integrally of inverse cup-shaped bulkhead 32 and outer wall 31 with filtering holes 30 drilled at its middle portion is inserted between guide cylinder 28 and convey cylinder 22, with leg 34 provided at the lower portion of said filtering frame resting on the bottom of outer housing 11. In this instance, handle bar 7 is bridged across an inner diameter of outer wall 31 at its upper portion.

When waste water, rain water or the like has flowed in through openings 9 on cover plate 10, it will accumulate at the bottom of filtering frame 33, further increasing until it overflows through filtering holes 30 and accumulate within the deodorizing recessed channel between outer housing 11 and convey cylinder 22, and finally it overflows through the top aperture of convey cylinder 22 into said convey cylinder. Therefore, foreign matters such as mud, dust and the like which has flowed in together with waste water, rain water or the like will accumulate within the inner bottom portion of filtering frame 33 and will never flow into the drain pipe. Furthermore, when these foreign matters have accumulated, filtering frame 33 will be detached out of guide cylinder 28 by lifting handle bar 7 after removing cover plate 10, whereby the foreign matters may be removed, and thus a washing of the filtering frame is facilitated. In addition, in case outer housing 11 is positioned with some inclination due to the fact that drain pipe 15 is equipped with inclination rather than perpendicularly, after positioning supporting cylinder 24 so that adjusting screw 26 threaded into supporting cylinder 24 may oppose against the lowest portion of inner projection 23 which inclines according to outer housing 11, by turning adjusting screw 26 in a forward direction so as to correct the inclination of supporting cylinder 24, supporting cylinder may be kept perpendicularly so as to maintain cover plate 10 horizontally. Then by finishing the floor by mortar 19, cover plate 10 is kept in a coplanar horizontal surface with the floor.

Referring now to FIGS. 7 and 8 of the accompanying drawings, there is shown a drainage trap as shown in FIGS. 1 to 4 but incorporated with a trap inclination correcting device as described with reference to FIGS. 5 and 6, in which drain pipe 15 is threaded into the bottom portion of outer housing 11, a flange of supporting cylinder 24 rotatably rests on inner projection 23 formed on said outer housing, on slope recess 35 formed along the inner circumference of guide 28 which is threaded within said supporting cylinder rest slope projection 36 formed along the outer circumference of outer cylinder 2, and a plurality of supporting bars 37 extend on the top of inverse cup-shaped bulkhead 8, an extremity of said supporting bar resting on projecting edge 38 provided inside of outer cylinder 2 so as to insert the lowermost portion of inverse cup-shaped bulkhead 8 into deodorizing recessed channel 4. With reference to other structures, every parts given common reference numeral with those in FIGS. 1 to 6 are quite the same as those described previously. Also the method of operation for correcting an inclination of a trap is quite the same as that described with reference to FIGS. 5 and 6.

The above description is a mere illustration of certain preferred embodiments of the present invention, and therefore it is apparent that various changes or omission of the form and arrangements of the component parts as shown and described herein can be made, as desired, without departing from the spirit and the scope of the invention.

What I claim is:

1. A floor drain, comprising an outer drain body one end of which is attachable to a drain pipe, said outer drain body being for embedding in a concrete floor, said outer drain body having a shoulder around the internal periphery thereof, an inner drain body having a corresponding shoulder around the outer periphery thereof by which said inner drain body is supported on said outer drain body, said inner drain body extending downwardly to a point adjacent the bottom of said outer drain body, an upwardly extending inner pipe on said inner drain body extending from the bottom thereof over the point at which said outer drain body is attachable to a drain pipe, and an inverted cup having a solid bottom over said upwardly extending pipe, the sides of said cup extending downwardly toward the bottom of said outer drain body between and spaced from said inner drain body and said upwardly extending pipe and terminating short of the bottom of said outer drain body, the inside of the bottom of said cup being spaced above the top of said upwardly extending pipe, a bridge member on the outside of the bottom of said cup and resting on said inner drain body, and means for holding said inner drain body and cup in engagement with said outer drain body.

2. A floor drain, comprising an outer drain body one end of which is attachable to a drain pipe, said outer drain body being for embedding in a concrete floor, an inner drain body supported on said outer drain body so as to be removable from said outer drain body and extending downwardly into said outer drain body toward the end attachable to a drain pipe, one of said drain bodies having thereon an upwardly extending inner pipe above the point at which said outer drain body is attachable to a drain pipe, and an inverted cup having a solid bottom positioned on said inner drain body, the sides of said cup extending downwardly toward the bottom of said outer drain body between and spaced from said inner drain body and said upwardly extending pipe and terminating short of the bottom of said outer drain body, the inside of the bottom of said cup being spaced above the top of said upwardly extending pipe, said outer drain body being comprised of an upper portion and a lower portion rotatably connected to each other for movement relative to each other about the vertical axis of said outer drain body, and adjustment means on one side of one of said portions of said outer drain body engageable with the other portion of said outer drain body for moving said portions toward and away from each other in the direction of the vertical axis only at said one side of said outer drain body.

3. A floor drain as claimed in claim 2 in which said lower portion of said outer drain body has an inwardly turned flange around the upper edge thereof, and said upper portion of said outer drain body has a supporting ring threaded therearound, means on said supporting ring slidably engaging under said flange on said lower portion, and a leveling screw through said supporting ring at only one point around the circumference thereof and engaged with said flange for moving said flange and said supporting ring apart.

4. A floor drain as claimed in claim 3 in which said inner drain body has an inwardly extending flange thereon around the upper end thereof, and said inverted cup has a bridge member on the outside of the bottom thereof, the ends of said bridge member resting on said inwardly extending flange on the inner drain body, said upwardly extending pipe being on said inner drain body.

References Cited in the file of this patent

UNITED STATES PATENTS

| | | |
|---|---|---|
| 1,507,531 | Vandell | Sept. 2, 1924 |
| 1,526,637 | Hess | Feb. 17, 1925 |
| 2,095,024 | Boosey | Oct. 5, 1937 |
| 2,101,978 | Boosey | Dec. 14, 1937 |